United States Patent
K et al.

(10) Patent No.: US 12,394,252 B2
(45) Date of Patent: Aug. 19, 2025

(54) PROGNOSTIC AND HEALTH MONITORING SYSTEM FOR A DEVICE WITH A ROTATING COMPONENT

(71) Applicant: Honeywell International Inc., Charlotte, NC (US)

(72) Inventors: Balasubramanya Raju B K, Bangalore (IN); Manu Shastry C R, Bangalore (IN); Raghavendra Muniraju, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 618 days.

(21) Appl. No.: 17/705,612

(22) Filed: Mar. 28, 2022

(65) Prior Publication Data

US 2023/0260332 A1 Aug. 17, 2023

(30) Foreign Application Priority Data

Feb. 11, 2022 (IN) .............................. 202211007366

(51) Int. Cl.
G07C 5/08 (2006.01)
B64F 5/60 (2017.01)
G07C 5/00 (2006.01)

(52) U.S. Cl.
CPC ........... G07C 5/008 (2013.01); G07C 5/0808 (2013.01); B64F 5/60 (2017.01)

(58) Field of Classification Search
CPC ....... B64F 5/60; G01H 1/003; G05B 23/0229; G05B 23/024; G05B 23/0254; G07C 5/008; G07C 5/0808
See application file for complete search history.

(56) References Cited

U.S. PATENT DOCUMENTS 8,131,420 B2 3/2012 Lynch et al.
9,437,054 B2 9/2016 Catt
(Continued)

FOREIGN PATENT DOCUMENTS

CN 109215165 A 1/2019

OTHER PUBLICATIONS

European Patent Office, "Extended European Search Report", from EP Application No. 23153023.9, from Foreign Counterpart to U.S. Appl. No. 17/705,612, Jun. 16, 2023, pp. 1 through 9, Published: EP.

*Primary Examiner* — Peter D Nolan
*Assistant Examiner* — Ce Li Li
(74) *Attorney, Agent, or Firm* — Fogg & Powers LLC

(57) ABSTRACT

A prognostic and health monitoring system for a device with a rotating component is provided. The system includes a plurality of sensors. Each sensor is configured to sense a parameter of the device. A controller is in communication output sensor signals. The controller, based on instructions stored in a memory, is configured to filter the output sensor signals based on operational speed data of the rotating component to obtain normalized sensor data, construct multivariate gaussian distribution parameters from the normalized sensor data using a central limit theorem, compare a model generated with a learning algorithm applied to previous constructed multivariate gaussian distribution parameters with the constructed multivariate gaussian distribution parameters, and determine a state of the device based at least in part on the comparison of model with the constructed multivariate gaussian distribution parameters. A communication system communicates the determined state of the device to a remote location.

17 Claims, 15 Drawing Sheets

(56) References Cited

U.S. PATENT DOCUMENTS

| | | | |
|---|---|---|---|
| 9,632,010 B2 | 4/2017 | Ding et al. | |
| 10,192,368 B2 | 1/2019 | Catt | |
| 11,457,809 B1* | 10/2022 | Biederman | A61B 5/14532 |
| 2006/0249667 A1* | 11/2006 | Goldberg | H01J 49/004 |
| | | | 250/281 |
| 2006/0249668 A1* | 11/2006 | Goldberg | G06F 18/00 |
| | | | 250/281 |
| 2015/0160101 A1 | 6/2015 | Gao et al. | |
| 2016/0238489 A1* | 8/2016 | Brenner | G01M 99/005 |
| 2017/0141668 A1* | 5/2017 | Xing | H02K 1/34 |
| 2019/0311556 A1* | 10/2019 | Thron | G07C 5/0808 |
| 2020/0064446 A1* | 2/2020 | Chan | G01S 7/415 |
| 2020/0408106 A1 | 12/2020 | Karnofski et al. | |
| 2021/0078723 A1 | 3/2021 | Li et al. | |
| 2021/0142292 A1* | 5/2021 | Ozcaglar | G06F 18/24 |
| 2023/0001932 A1* | 1/2023 | Sanchez | A61B 5/7264 |
| 2023/0163713 A1* | 5/2023 | Liu | G01R 31/343 |

* cited by examiner

Concentric  Static Eccentricity  Dynamic Eccentricity

Air-Gap: Static Eccentricity

Air-Gap: Dynamic Eccentricity

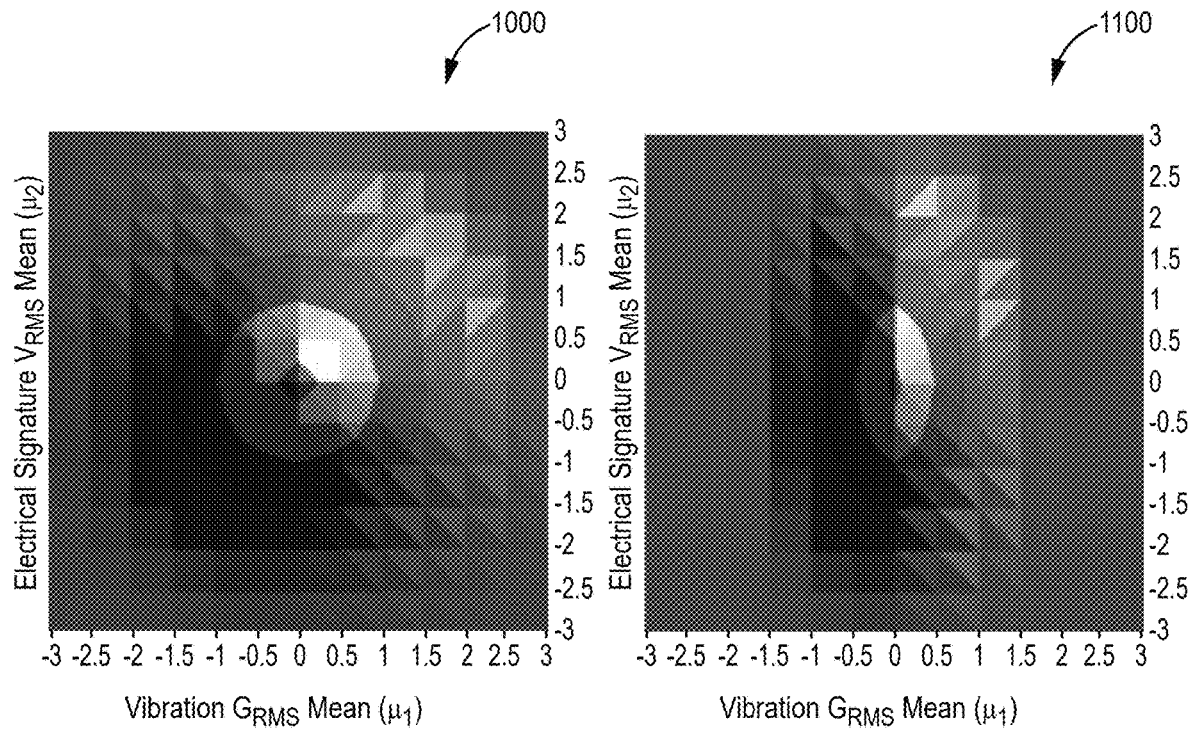
FIG. 10A          FIG. 11A
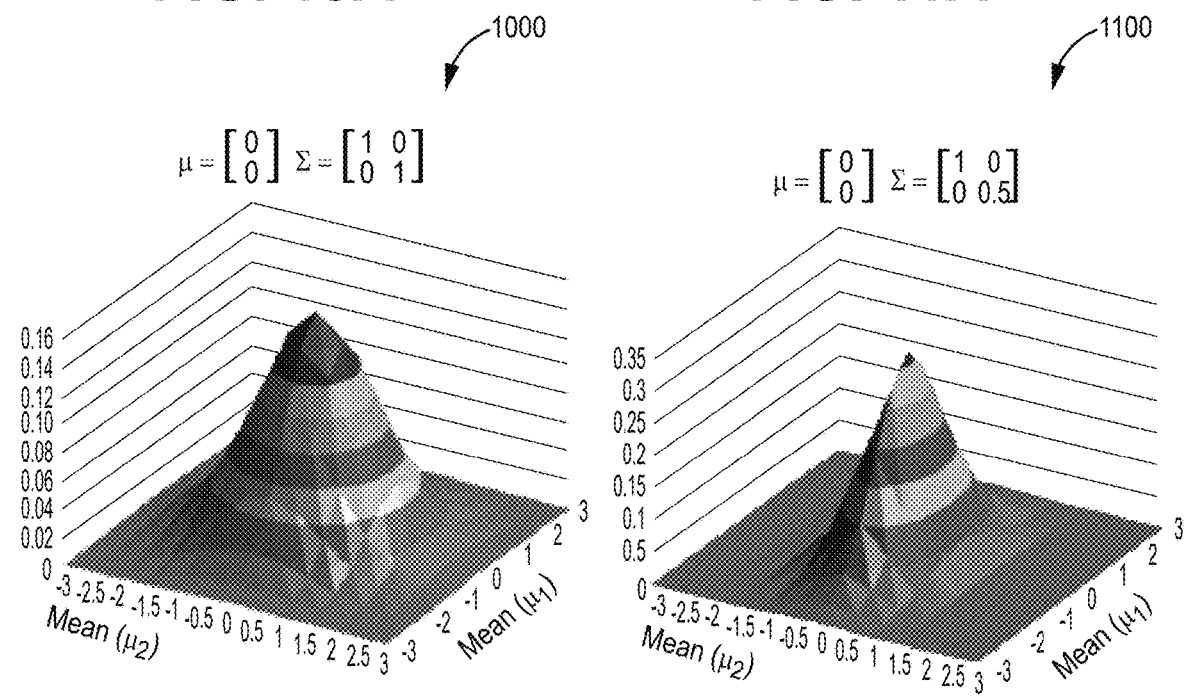
FIG. 10B          FIG. 11B

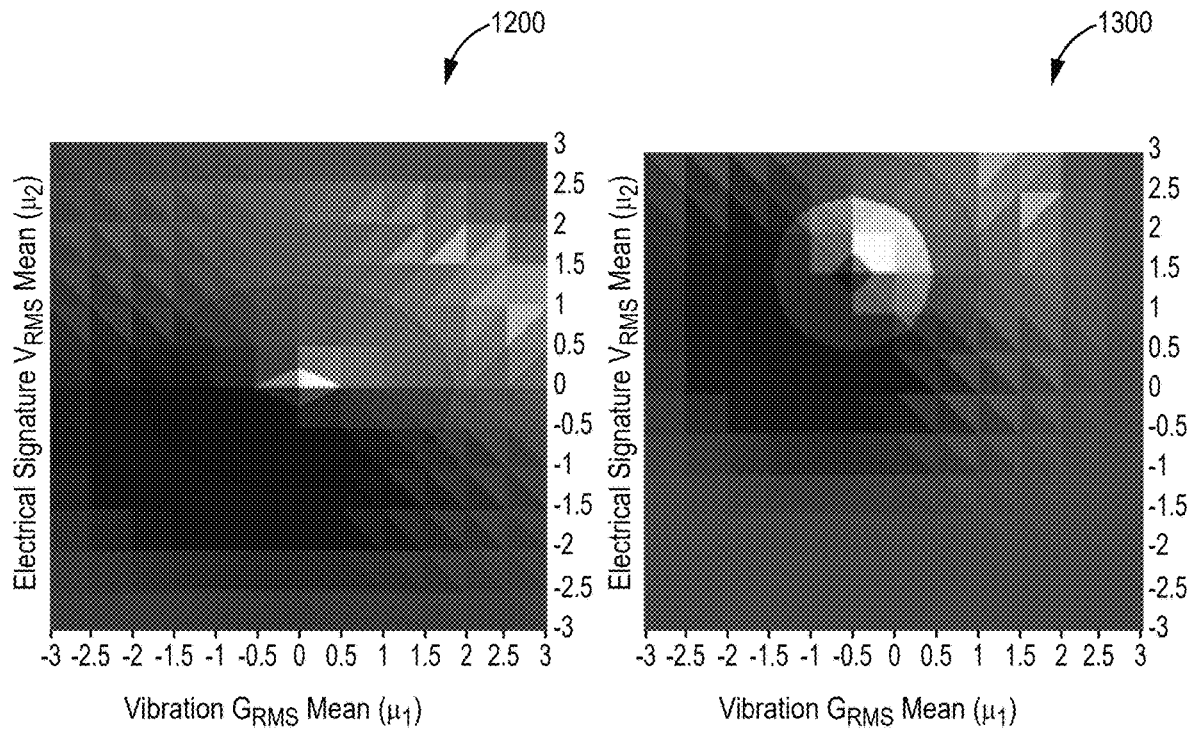
FIG. 12A  FIG. 13A
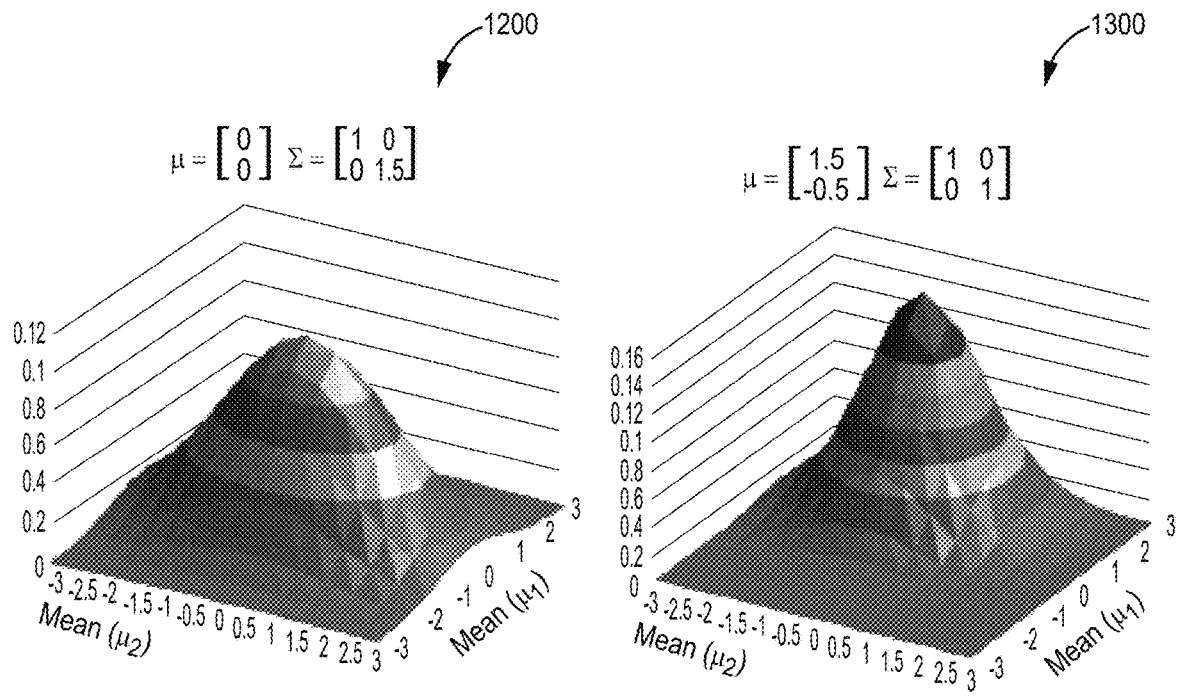
FIG. 12B  FIG. 13B

PROGNOSTIC AND HEALTH MONITORING SYSTEM FOR A DEVICE WITH A ROTATING COMPONENT

CROSS REFERENCE TO RELATED APPLICATIONS

This application claims benefit of Indian Provisional Application No. 202211007366 entitled "PROGNOSTIC AND HEALTH MONITORING SYSTEM FOR A DEVICE WITH A ROTATING COMPONENT" and filed on Feb. 11, 2022, the contents of which are incorporated herein in their entirety.

BACKGROUND

Devices with a rotating component will eventually fail. Knowing when to replace such a component before it fails is critical in some vehicle applications. For example, for safe operation of aircraft, it is important that critical rotational components do not fail during flight. An aircraft generator is an example of a device having a critical rotational component. An aircraft may include several different types of generators including main generators, auxiliary power unit generators, ram air turbine generators and ground power unit generators. To avoid the possibility of a catastrophic failure during operation, aircraft generators and associated components are typically replaced based on a time of usage even though they may still have useful life left. Replacing a device with a rotating component can be expensive. Not only are their cost associated with replacement parts but there might also be costs associated with the time the device is out of service. These costs may include losses of revenue and a lower operational efficiency.

An alternative method to time of usage replacement, or in addition to time of usage replacement, is the use of health-based monitoring. Health-based monitoring monitors a parameter, such as vibrations, with a sensor to determine if there is an issue with a component. Operations of a sensor, however, may be subject to uncertainties due to accuracy related errors, long term drifts and other failures. Failures or performance degradation in devices with a rotating component may occur in one of the following components: a rotating rectifier, a shaft and associated bearings, rotor windings, a stator field winding, an exciter armature, rectifier diodes, and exciter windings. Currently there are no adequate health-based monitoring solutions available for the rotating components such as rotor windings, rectifier diodes and exciter windings. In addition, accessing and/or drawing power through wires for prognostics in an aircraft generator example is an intrusion into the aircraft/generator system which would result in an expensive, time consuming and labor intense validation and certification process.

For the reasons stated above and for other reasons stated below which will become apparent to those skilled in the art upon reading and understanding the present specification, there is a need in the art for an effective and efficient prognostic and health monitoring system for devices with a rotating component.

SUMMARY OF INVENTION

The following summary is made by way of example and not by way of limitation. It is merely provided to aid the reader in understanding some of the aspects of the subject matter described. One example embodiment provides an effective and efficient prognostic and health monitoring system that includes a plurality of sensors that generate sensor data. A controller is configured to construct multivariate gaussian distribution parameters from normalized sensor data with a learning algorithm using a central limit theorem.

In one embodiment, a prognostic and health monitoring system for a device with a rotating component, the system including a plurality of sensors, a controller, and a communication system. Each sensor is configured to sense a parameter of the device and output sensor signals based on the sensed parameter. The controller is in communication with the output sensor signals. The controller, based on instructions stored in a memory, is configured to filter the output sensor signals based on operational speed data of the rotating component of the device to obtain normalized sensor data, construct multivariate gaussian distribution parameters from the normalized sensor data using a central limit theorem, compare a model generated with a learning algorithm applied to previous constructed multivariate gaussian distribution parameters with the constructed multivariate gaussian distribution parameters, and determine a state of the device based at least in part on the comparison of the model with the constructed multivariate gaussian distribution parameters. The communication system is in communication with the controller to communicate the determined state of the device to a remote location.

In another embodiment, another prognostic and health monitoring system for a device with a rotating component is provided. The system includes at least one sensor node and a controller. Each sensor node included a plurality of sensors configured to sense a plurality of different parameters and output sensor signals based on the sensed parameters. A sensor node of the at least one sensor node is further configured to harvest energy to power at least one sensor of the plurality of sensors. The controller is in communication with the output sensor signals. The controller is configured to filter the output sensor signals based on machine operational speed data to obtain normalized sensor data, construct multivariate gaussian distribution parameters from the normalized sensor data with a learning algorithm using a central limit theorem, compare a model formed from previous multivariate gaussian distribution parameters with the constructed multivariate gaussian distribution parameters, and determine a state of the device with the rotating component based at least in part on the comparison of the model with the constructed multivariate gaussian distribution parameters.

In yet another embodiment, a method of monitoring a health of a device with a rotational component, the method comprising: sensing a plurality of parameters associated with an operation of the device with the rotational component to generate sensing signals with a plurality of sensors; filtering the sensing signals based on operational speeds of the rotational component of the device to generate normalized sensor data; constructing multivariate gaussian distribution parameters from the normalized sensor data with a controller implementing a learning algorithm using a central limit theorem; comparing a model of previous multivariate gaussian distribution parameters with the constructed multivariate gaussian distribution parameters; determining a state of the device with a rotational component based at least in part on the comparison of the model with the constructed multivariate gaussian distribution parameters; and communicating the determined state of the device with a rotational component to a remote location with a communication system that is in communication with the controller.

BRIEF DESCRIPTION OF THE DRAWINGS

The present invention can be more easily understood and further advantages and uses thereof will be more readily apparent, when considered in view of the detailed description and the following figures in which:

FIG. 10A illustrates a top view of a bivariate normal distribution curves of the vibration $G_{RMS}$ mean $\mu_1$ dataset and the machine electrical signature $V_{RMS}$ mean $\mu_2$ dataset illustrating an aligned multivariate gaussian with healthy datasets according to one exemplary embodiment;

FIG. 10B illustrates a side perspective view of the bivariate normal distribution curves of FIG. 10A;

FIG. 11A illustrates a top view of a bivariate normal distribution curves of the vibration $G_{RMS}$ mean $\mu_1$ dataset and the machine electrical signature $V_{RMS}$ mean $\mu_2$ dataset illustrating an aligned multivariate gaussian in an elliptical on $V_{RMS}$ according to one exemplary embodiment;

FIG. 11B illustrates a side perspective view of the bivariate normal distribution curves of FIG. 11A;

FIG. 12A illustrates a top view of a bivariate normal distribution curves of the vibration $G_{RMS}$ mean $\mu_1$ dataset and the machine electrical signature $V_{RMS}$ mean $\mu_2$ dataset illustrating an aligned multivariate gaussian in an elliptical on $G_{RMS}$ according to one exemplary embodiment;

FIG. 12B illustrates a side perspective view of the bivariate normal distribution curves of FIG. 12A;

FIG. 13A illustrates a top view of a bivariate normal distribution curves of the vibration $G_{RMS}$ mean $\mu_1$ dataset and the machine electrical signature $V_{RMS}$ mean $\mu_2$ dataset illustrating a non-axis aligned multivariate gaussian bell curve offset on x and y axis according to one exemplary embodiment;

FIG. 13B illustrates a side perspective view of the bivariate normal distribution curves of FIG. 13A;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a prognostic and health monitoring system that includes a plurality of sensors and a controller configured to construct multivariate gaussian distribution parameters from normalized sensor data with a learning algorithm using a central limit theorem. Embodiments provide an improvement over known health-based monitoring systems by providing a system that can accurately detect a plurality of different type faults that may lead to a failure of a device with a rotating component. Further embodiments may include at least one energy harvester to harvest energy for operation of at least a portion of the prognostic and health monitoring system. A prognostic and health monitoring system with an energy harvesting system is further an improvement over known systems as discussed below. Although applications discussed below may reference generators, embodiments can be applied to any simple or complex machine (device) with a rotating component such as, but not limited to, auxiliary power units, air turbine starters, engines, compressors, and turbines.

Figures 1A, 1B, 1C:
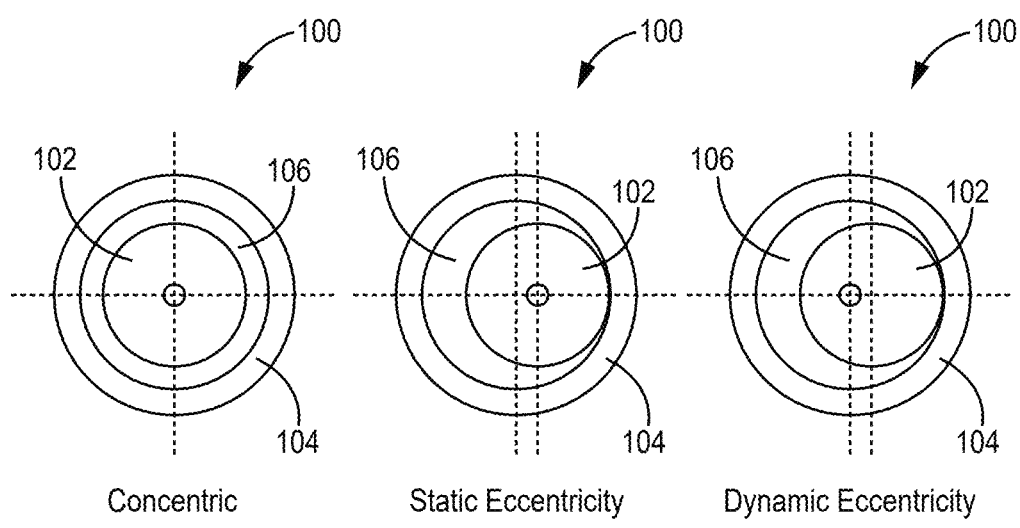
FIG. 1A illustrates a rotor in a concentric configuration with a stator in the prior art.
FIG. 1B illustrates a rotor in a static eccentricity configuration with a stator in the prior art.
FIG. 1C illustrates a rotor in a dynamic eccentricity with a stator in the prior art.

For further background, some examples of device faults that can be detected with a prognostic and health monitoring system is provided. In devices with rotating components that include a rotor 102 and stator 104, a defect may occur when an air gap 106 between the rotor 102 and stator 104 is not uniform. An illustration of this is provided in the end views of a rotor/stator arrangement 100 in FIGS. 1A, 1B and 1C. FIG. 1A illustrates the rotor 102 being in a concentric configuration with the stator 104. In this configuration the air gap 106 evenly spaces the rotor 102 from the stator 104. Air gap eccentricity represents a condition where distance of air gap 106 between the rotor 102 and the stator 104 is not uniform. There are two types of abnormal air gap eccentricity that exist, a static eccentricity as illustrated in FIG. 1B, and a dynamic eccentricity as illustrated in FIG. 1C.

Figure 1D:
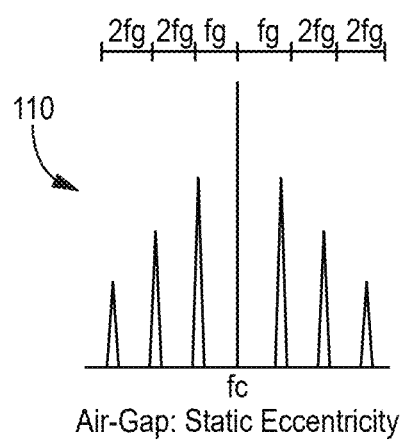
FIG. 1D illustrates a static eccentricity frequency graph of the prior art.

In case of static eccentricity, the variation of minimal radial air gap 106 is fixed around the circumference, while in case of dynamic eccentricity a variation of minimal air gap 106 follows the turning of the rotor 102. As the rotor 102 withdraws or approaches the stator 104 the magnetic fields change. The change in the magnetic fields cause a change to a current in the stator 104. Sideband components appear at frequencies determined by number of rotor bars, slip, pole pairs, and electrical supply current frequency. An example of frequencies detected in a static eccentricity example is illustrated in the static eccentricity frequency graph 110 of FIG. 1D.

Figure 1E:
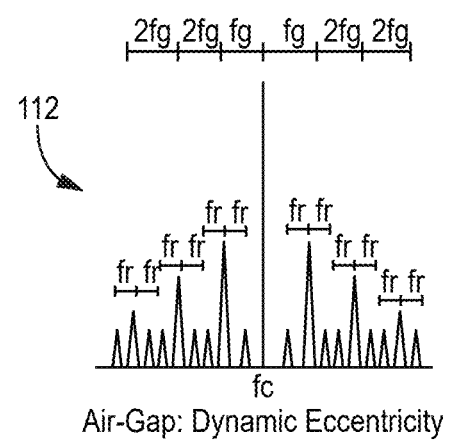
FIG. 1E illustrates a dynamic eccentricity frequency graph of the prior art.

When dynamic eccentricity is present, frequency components from static eccentricity are further modulated with the rotational frequency as shown in the dynamic eccentricity frequency graph 112 of FIG. 1E. Embodiments may predict the shaft air-gap eccentricity using the prognostic and health monitoring system. As discussed below, datasets from more than one sensor, for example datasets from an analog magnetic sensor, an electromagnetic image (EMI) sensor, vibration sensors, or acoustic sensors are collected to establish a model. An air-gap eccentricity fault will be inferenced with a decision tree based on the established model and with a further use of a regression analysis, prediction of faults may be determined.

Another example of a failure that can be detected in a rotor/stator arrangement is a broken rotor bar. A broken rotor bar failure may cause sparking and overheating in an electrical motor. By investigating the frequency spectrum of the stator currents, early stages of rotor failures can be detected with embodiments. When a broken rotor bar is present, current components in stator windings can be detected by examining the frequencies. The upper and lower sidebands around supply component are separated by twice the slip frequency. As a simple rule, if the difference between the main and sideband components is greater than 50 dB the rotor has no faults. However, when difference is in range between 40 and 50 dB there is probably one bar of the stator broken and with difference less than 40 dB there are several broken bars of the stator or a broken end ring.

In yet another stator example, stator failures are commonly related to stator winding shorted turns. Shorted turns produce excessive heat in stator coil and current imbalance. Motor current signature analysis shows that rotating flux waves can induce corresponding components in the stator windings. Motor current components that are influenced only by shorted turns can be detected at certain sideband frequencies. Detection of stator winding shorted turns faults may be accomplished with the proposed prognostic and health monitoring system in embodiments. Shorted turns faults may be inferenced my monitoring the leakage magnetic field and harmonics of the EMI signatures from the motor cage and surface temperature of the motor. A dataset from magnetic analog sensor, EMI or electric field sensor and contact temperature sensor or infrared thermal camera may be collected to establish the model.

Detection of broken rotor bar may also be accomplished using embodiments of the prognostic and health monitoring system using the teachings as shown and described below. The broken rotor bar fault will be inferenced by monitoring the leakage magnetic field and harmonics of the EMI signatures from the motor cage. A dataset from magnetic analog sensor and EMI sensor are collected to establish a model. Further with regression analysis, prediction of faults may be determined.

Figure 1F:
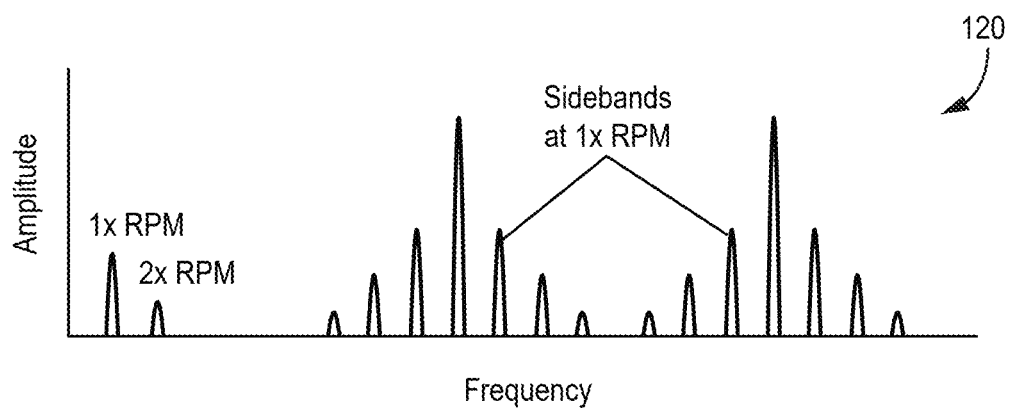
FIG. 1F illustrates a bearing fault amplitude verses frequency graph of the prior art.

Bearings are important components in motors and other rotating components of devices. Bearing failures represent one of the most common failures in induction motors and motor fans. Bearing failure can lead to motor breakdown, loss of production, income, and even human casualties. Therefore, health monitoring and fault diagnosis for bearings are important and play a key role in the reliable operation of motors. Bearing faults that are widespread in the industry can be categorized into two types, namely, single-point faults and generalized-roughness faults. A single-point fault is an obvious defect (e.g., pit and spall) localized on the bearing surface. It is usually caused by overloading during operation, which leads to a fatigue crack in the bearing surface until a piece of metal drops off. Generalized-roughness faults are faults that considerably degrade, roughen, or even deform the bearing surface. Some common causes of this type of fault are contamination, lack or loss of lubricant, and misalignment. An example how bearing faults present themselves in frequency spectrum is illustrated in the bearing fault amplitude verses frequency graph 120 of FIG. 1F. Prediction of bearing faults may be performed with the proposed prognostic and health monitoring system of embodiments. A dataset from vibration sensor and ultrasonic sensor shall be collected to establish the model. Type of bearing faults will be inferenced by frequencies examination and applying CTL followed by regression as described below.

Figure 2:
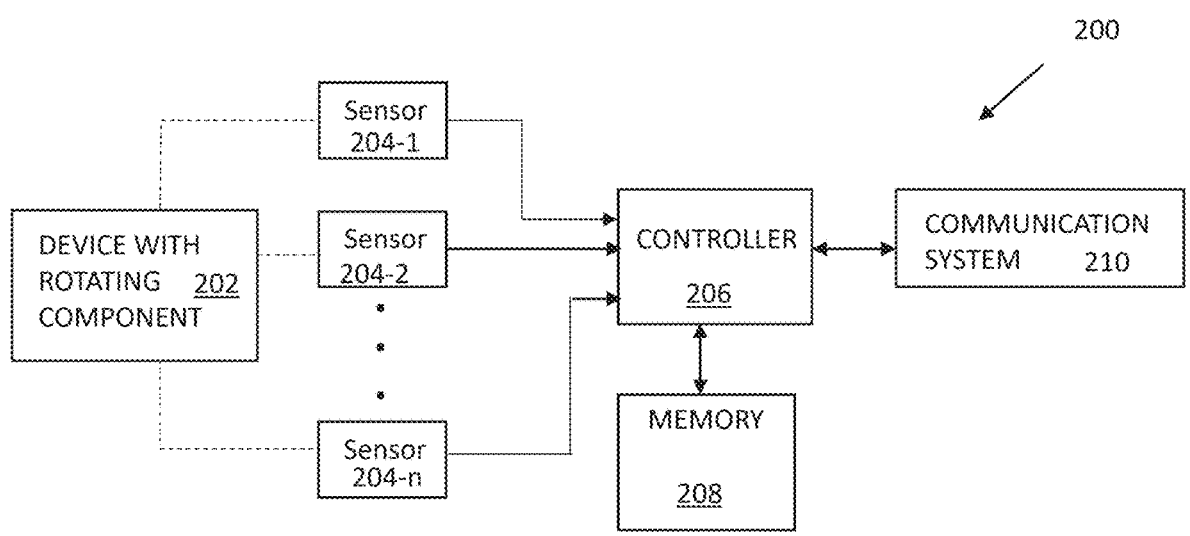
FIG. 2 is a block diagram of a generator prognostic and health monitoring system according to one exemplary embodiment.

Referring to FIG. 2, a block diagram of a prognostic and health monitoring system 200 of one example is provided. The prognostic and health monitoring system 200 includes a plurality of sensors 204-1, 204-2 through 204-$n$ that monitor parameters associated with a device 202 with a rotating component, such as but not limited to, a generator. Outputs of the sensors, generally referenced as 204, are in communication with a controller 206. The controller 206 is in communication with a memory 208. The memory 208 stores at least operating instructions for the controller 206, sensed data, and processed sensed data. The controller 206 is in communication with a communication system 210. The communication system 210 may include a display and/or a system to communicate output signals from the controller 206 to a remote location as discussed further below. The communication system 210 in one example includes wireless communication components.

In general, the controller 206 may include any one or more of a processor, microprocessor, a digital signal processor (DSP), an application specific integrated circuit (ASIC), a field program gate array (FPGA), or equivalent discrete or integrated logic circuitry. In some example embodiments, controller 206 may include multiple components, such as any combination of one or more microprocessors, one or more controllers, one or more DSPs, one or more ASICs, one or more FPGAs, as well as other discrete or integrated logic circuitry. The functions attributed to the controller 206 herein may be embodied as software, firmware, hardware or any combination thereof. The controller 206 may be part of a system controller or a component controller. The memory 208 may include computer-readable operating instructions that, when executed by the controller provides functions of the generator prognostic and health monitoring system. Such functions may include the functions of filtering sensors signals, constructing multivariate gaussian distribution parameters from normalized sensor data with a learning algorithm using a central limit theorem, generating a model, etc. as described below. The computer readable instructions may be encoded within the memory 208. Memory 208 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically erasable programmable ROM (EEPROM), flash memory, or any other storage medium.

Example of sensors 204 include, but are not limited to, microphones, ultrasound microphones, accelerometers (including three-axis accelerometers), infrared (IR) reflection sensors, temperature sensors, pressure sensors, humidity sensors, IR image sensors, electromagnetic image (EMI) sensors, magnetometers (magnetic field sensors), electric field sensors, and current clamps. The sensors 204 may be in communication with the controller 206 through standard digital or analog interfaces.

In general, microphones may be used for audio data acquisition of moving mechanical components. The ultrasound microphones may be used for ultrasound data acquisition. The accelerometers may be used for vibration data acquisition of moving mechanical components and shaft rotation speed. The IR reflector sensors may be used for shaft speed sensing. The temperature sensors may be used for temperature recording of rectifier diodes. The pressure and humidity sensors may be used for ambient pressure and humidity recording. The IR image sensors may be used for rectifier diodes and winding contactless temperature measurement. The EMI sensors may be used for acquiring electromagnetic emission patterns. The magnetometer may be used for acquiring magnetic field signals and the current clamps may be used for recording current readings of stator/rotor/exciter coils.

One type of electric field sensor that may be used is a non-invasive electric (E)-Field sensor 204 that uses an instrumentation method to detect an electric field, electromagnetic force (EMF), and electric charge signatures that are generated, for example, by rotating machines, transformers, and coils windings of a motor. An electrical signature analysis (ESA) may be used to provide augmented information on the health of a system and its potential failures. For example, E-field sensor data fusion with vibration or acoustic signatures applied using proposed algorithm instructions will benefit fault causal exploration, analysis, and prediction.

A type of electromagnetic (EM) field measurement that may be used is a non-invasive EM-Field sensor and instrumentation method to detect electromagnetic signatures picked up form rotating devices, transformers, and coil windings of a motor. An ESA may be complemented with EM field measurements.

A type of magnetic field sensor (B-Field sensor) that may be used is a non-invasive B-field sensor 204 using an instrumentation method to detect the magnetic signature from the rotating machines, transformers, and coils windings of a motor. A three-axis magnetic field (B) signals measured by the non-invasive B-field sensor from electrical devices may be used to decode machine speed information and may be used for data sorting and filtering. A low-level B-field signal may be conditioned to decode loop currents of the devices without direct instrumentation on the devices. A magnetic signature analysis (MSA) may complement analytical information as with the ESA discussed above.

Figure 3:
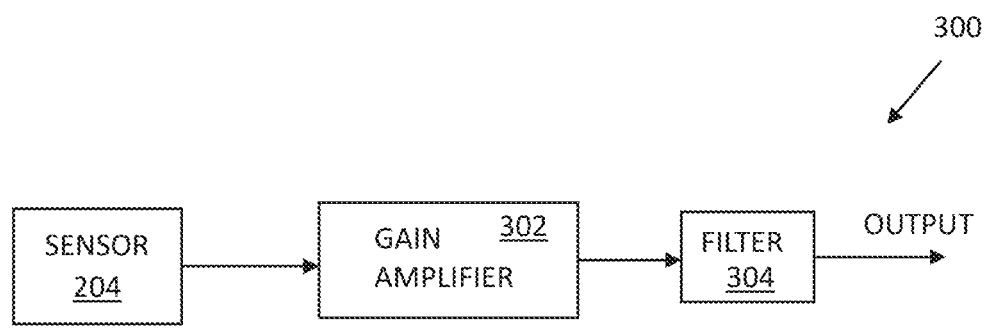
FIG. 3 is block diagram of the pre-processing system according to one exemplary embodiment.

A signal from a sensor 204 may be pre-processed to extract desired information. FIG. 3 illustrates an example of the pre-processing system 300. In this example, a signal from a sensor 204 is amplified with a gain amplifier 302 and then filtered with a filter 304 to extract desired signal information that is provided to the controller 206. In the B-field sensor 204 example, the pre-processing from the pre-processing system may isolate signals to derive intensities at specific harmonic frequencies. Filtering may include analog filter and/or digital filtering. In one example, the filtering is digital filter conducted by the controller 206.

One feature of the prognostic and health monitoring system 200 is that it may include an energy harvesting system that harvests energy from existing systems, such as existing aircraft sub-systems, to power at least one sensor. As discussed above, accessing and/or drawing power through wires for prognostics of a generator may be an intrusion into the aircraft/generator system which may call for extensive validation and certification cost and efforts. The use of an energy harvesting system is non-intrusive and does not require an extensive validation and certification process.

Figure 4:
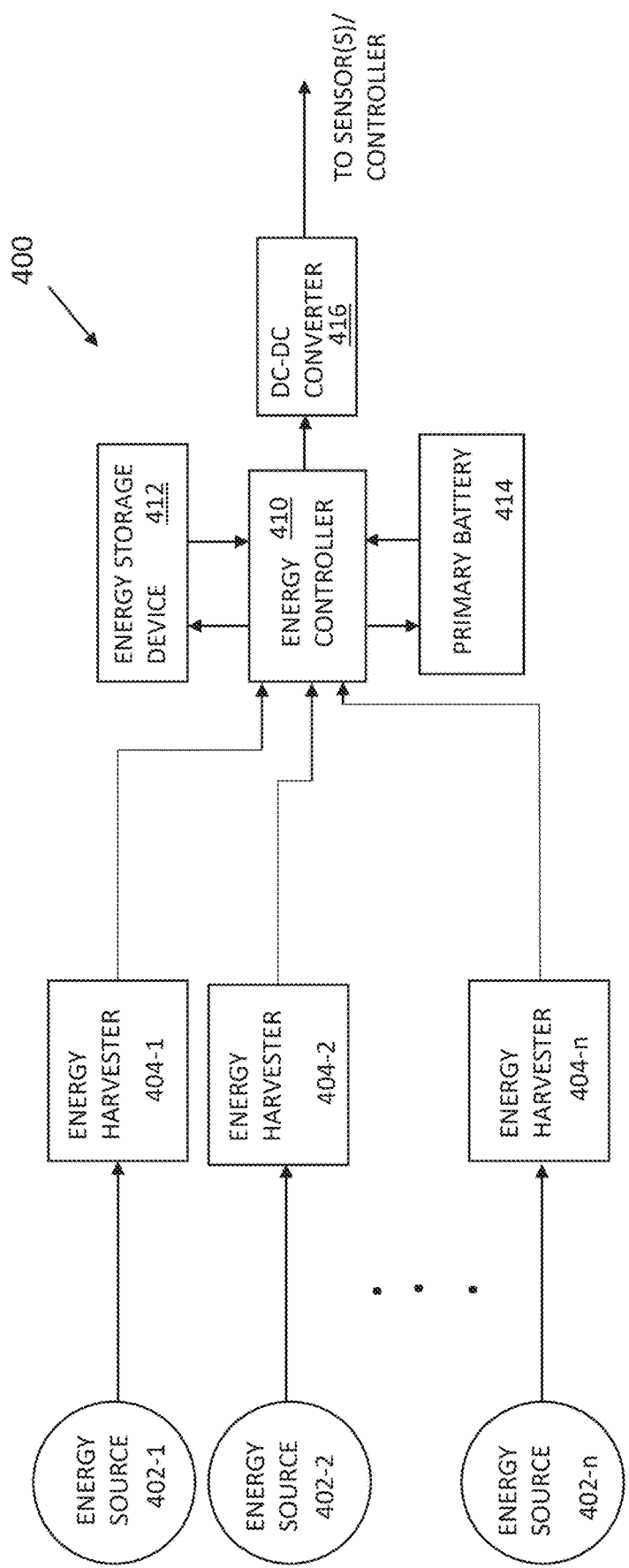
FIG. 4 is a block diagram of an energy harvesting system according to one exemplary embodiment.

An example of an energy harvesting system 400 is illustrated in FIG. 4. The energy harvesting system harvests or scavenges energy from various physical energy sources 402-1, 402-2 through 402-n. The energy sources, which may generally be referenced by 402, may include, but is not limited to, vibration energy sources, rotating energy sources and thermal energy sources. Energy harvesters 404-1, 404-2 through 404-n, which can be generally referenced by 404, harvests and coverts the energy into an electrical form that may be used to power the sensors 204, controller 206 and communication system 210 described above.

In the vibratory energy source 402 example, energy is harvested by an electromagnetic/piezo based harvester 404. The harvester 404 in this example would include a rectification/AC-DC converter circuit that converts harvested AC current to DC current. Further, in the energy harvesting example from a rotating member example, the energy harvester 404 would also include a rectification/AC-DC converter circuit to convert the energy to a DC current. The energy harvester 404 in the thermal energy source example would include front-end circuit elements known in the art to generate a DC current. As discussed above, other types of energy harvesters may be used, such as but not limited to, vibration based electromagnetic energy harvesting, photo voltaic based energy harvesting, and radio frequency (RF) based energy harvesting.

An energy controller 410 is coupled to receive the DC current from the energy harvesters 404. The energy controller 410 in one example includes one or more energy scavenging integrated circuits. Energy currently not needed is stored by the energy controller 410 in the energy storage device 412. The energy storage device 412 may be a capacitor, a rechargeable battery, or the like. In one example, a primary battery 414 is further coupled to the energy controller 410. The primary battery 414 that may be used whenever usability is needed and permitted. An output of the energy controller 410 may be coupled to a DC-DC converter 416 to achieve a desired voltage level. An output of the DC-DC converter may be supplied to power at least one of the sensors 204, the controller 206 as well as the communication system 210.

Figure 5A:
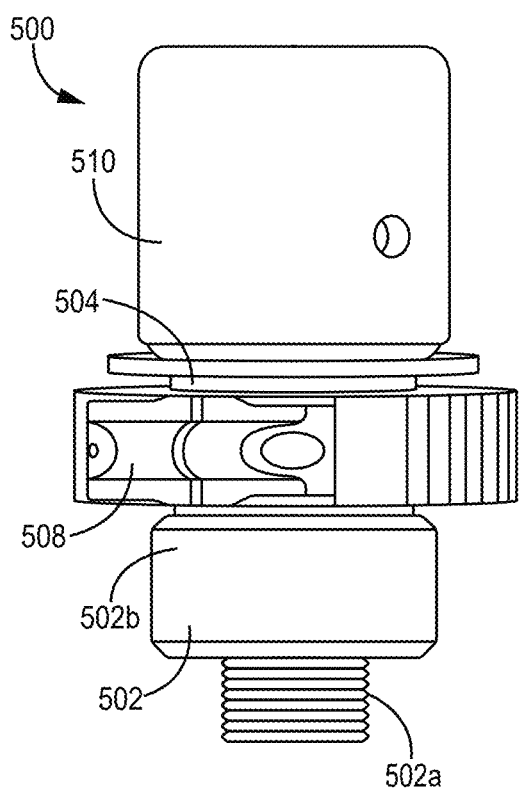
FIG. 5A is a side assembled view of a sensor node according to one exemplary embodiment.
Figure 5B:
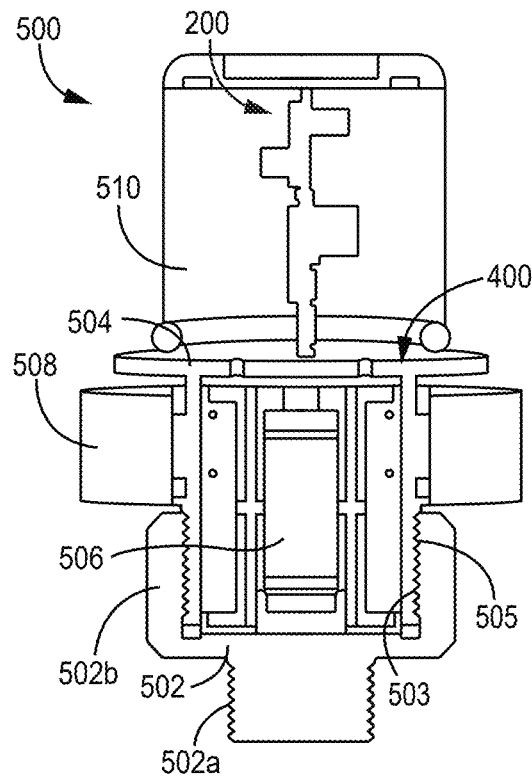
FIG. 5B is a side cross-sectional side view of the sensor node of FIG. 5A.

An example of a sensor node 500 is illustrated in the assembled side view of FIG. 5A and in the cross-sectional side view of FIG. 5B. As this example illustrates, the prognostic and health monitoring system 200 and the energy harvesting system 400 may be integrated in the same sensor node 500. In other embodiments, the prognostic and health monitoring system 200 and the energy harvesting system 400 and even components of the systems 200 and 400 are not integrated in the same sensor node 500.

The sensor node 500 of this example, includes an attaching portion 502 having a mounting threaded portion 502a and a hex nut portion 502b with interior threads 503. The mounting threaded portion 502 is designed to be received in a threaded bore of a device to be monitored such as a housing of a generator and the like.

The sensor node 500 further includes an energy harvesting mid-housing portion 504. The energy harvesting mid-housing portion 504 in this example includes exterior threads 505 designed to threadably engage the interior threads 503 of the attaching portion 502. The energy harvesting mid-housing portion 504 may including the energy harvesting system 400. In this example, the energy harvesting system 400 includes an electromagnetic energy (EM) harvesting system 506 that is received within the energy mid-harvesting portion 504 and a thermoelectric generator (TEG) energy harvesting system 508 that is attached around the energy harvesting mid-harvesting portion 504. Energy harvested by the energy harvesting systems 506 and 508 is provided to the components in a sensor housing 510.

As discussed above, the components in the sensor housing 510 may include the prognostic and health monitoring system 200 that includes sensors 204 in an example embodiment. This example provides an integrated self-powered sensor node 500. The communication system 210 of the generator prognostic and health monitoring system 200 may include a wireless transmitter to communicate an output of the controller 206 to a remote location. Being able to selectively couple a sensor node 500 that has on-device data intelligence provides a system with easy scalability. As discussed above, in other embodiments, components of the generator prognostic and health monitoring system 200 and energy harvesting system 400 are not located at the same location.

Figure 6:
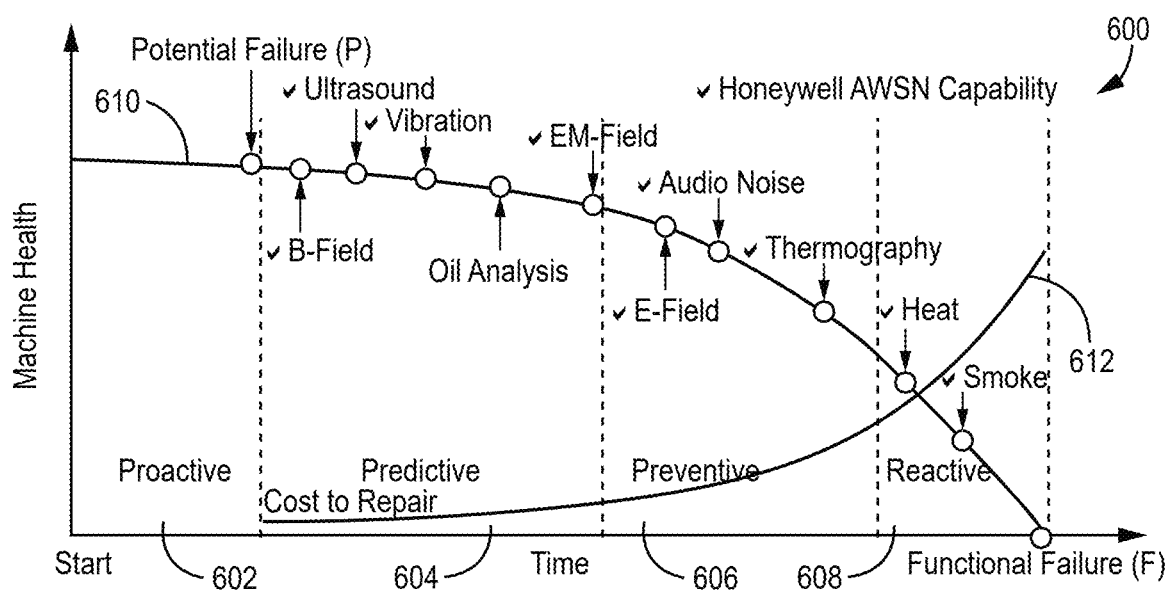
FIG. 6 is a machine health verses time in use graph according to one exemplary embodiment.

Referring to FIG. 6, a machine health verses time in use graph 600 is illustrated. Graph 600 illustrates a potential failure (P) curve 610 and a cost to repair curve 612 across possible maintenance time frames. The maintenance time frames include a proactive time frame 602, a predictive time frame 604, a preventive time frame 606, and a reactive time frame 608. Along the potential failure curve are parameters that may be monitored with sensors 204 to determine the current condition of a device with a rotating component such as a generator. As illustrated, the cost to repair increases exponentially with respect to operating time with the highest cost reached at the functional failure (F) point.

Figure 7:
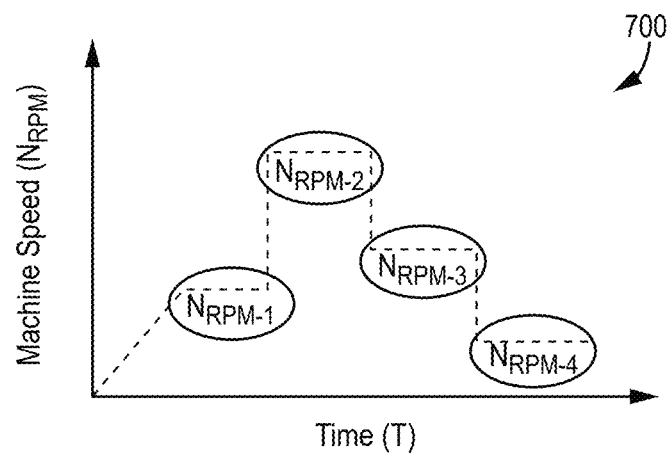
FIG. 7 is a machine speed $N_{RPM}$ verses time graph according to one exemplary embodiment.

The controller 206, discussed above, implements instruction algorithms stored in the memory 208 that provide interfacing of sensor data to generate an accurate failure prediction. In embodiments, a speed dataset is first determined by filtering speed data of the rotating component of a device. A speed dataset is a key input in aggregating accurate parameter datasets because vibration signals, acoustics signatures, electrical signatures and magnetic signatures will vary in association with machine speed. A mean u of specific sensor datasets are collected based on a machine speed $N_{RPM}$ (rotation rate of the rotating member). A machine speed $N_{RPM}$ may be deduced by monitoring the magnetic signature, monopoles, and optical reflective signals using one or more sensors 204. A graphical representation of machine speed $N_{RPM}$ verses time graph 700 is provided in FIG. 7. As discussed, correlation is established between the machine speed $N_{RPM}$ and other sensor parameter datasets in embodiments.

The algorithm instructions implemented by the controller 206 in embodiments may be based on central limit theorem (CLT), normal distribution, linear or multi polynomial regression analysis and a special inferencing algorithm. In the CLT example, the statistical premise is that given a sufficiently large sample size from a whole population with a finite variation, the mean value u of all sampled variables from the same population will be approximately equal to the mean value u of the whole population and the samples will approximate normal deviation of the whole population as the sample size gets larger. This will hold true regardless of whether the source population is normal or unknown, provided the sample size is sufficiently large (usually n>30). Hence, a normal-distribution probability estimation model to quantify uncertainty may be used when making inferences about a population mean value u based on the sample mean value u. With reference to a sensor dataset, if a dataset is collected at random instances, for example vibration data integrated over time, then the sample mean value u of the vibration would be normally distributed if the sample size is n>30.

A larger dataset will improve accuracy of distribution parameterization. Applying CLT to a collected sensor dataset for specific time interval will result in calculating the mean value μ. Tracking the mean value μ for various sensors at different speed intervals and establishing the correlation with the machine failures helps in inferencing and prediction of the health of a machine device with a rotating component.

The CLT and learning algorithm of an embodiment may be applied to time domain features of the sensor datasets such as, but not limited to, root mean square (RMS), crest-factor, kurtosis, variance and skewness. For example, vibration signature $G_{rms}$, motor magnet signature $M_{CF}$ crest-factor, and machine electric field mean $M_{EF}$ may be monitored.

Further the CLT and learning algorithm of an embodiment may be applied to frequency domain features from the sensor datasets such as sideband, center frequency (CF), mean square frequency (MSF), root mean square frequency (RMSF), standard deviation frequency, power spectral density frequency, energy spread, and peak identification. For example, a compressor acoustic signature power spectral density CPSD, turbine vibration root-mean square frequency TRMSF, and pumps electro-magnetic harmonics center frequency PCF may be monitored.

Any or all the above parameters from the sensor data may be defined through data collection and filtering. After defining the specific parameters, a healthy dataset learning will be initiated to extract features integrated over time as discussed below in view of FIG. 15. The extracted dataset may further be processed to track the mean values u and establish correlation between samples of different intervals to validate the model. Based on the deviation of the resultant data, an edge node may provide the resulting inference information about the device with a rotating component. Further with regression analysis, the prediction of the failures may be determined.

Figure 8A:
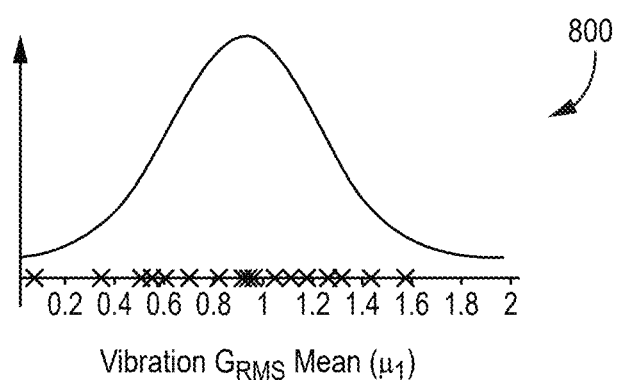
FIG. 8A is a machine vibration $G_{RMS}$ mean $\mu_1$ dataset graph according to one exemplary embodiment.
Figure 8B:
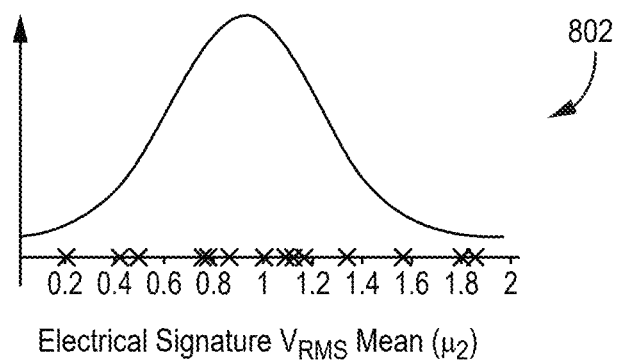
FIG. 8B is a machine electrical signature $V_{RMS}$ mean $\mu_2$ dataset graph according to one exemplary embodiment.

The time and frequency domain feature datasets can be correlated using multivariate CLT for multi-sensor data fusion. FIGS. 8A and 8B illustrate bell curves 800 and 802 (bivariate normal distribution) representing a correlation between two sensor datasets. The dataset illustrated in FIG. 8A is from a machine vibration $G_{RMS}$ mean $\mu_1$ dataset and the dataset illustrated in FIG. 8B is from a machine electrical signature $V_{RMS}$ mean $\mu_2$ dataset. As illustrated in FIGS. 8A and 8B, with sufficiently large random dataset from the population the distribution of the sample mean values $\mu_1$ and $\mu_2$ will be approximately normally distributed.

The multivariate Gaussian distribution of the CLT for machine vibration and electrical signature is given by following equation:

$$f\left(x_i; \mu i, \sum i\right) = \frac{1}{(2\pi)^{n/2}|\sum i|^{\frac{1}{2}}} \exp\left(-\frac{1}{2}(xi-\mu i)^T \sum {}^{-1}(xi-\mu i)\right)$$

Where f(xi;µi,Σi) is a probability function, Σi is a covariance matrix, |Σi|12 is a real number, (xi–µi)T is [m×n] or [n×m] dimensional, and Σi–1 is [n×n] dimensional.

The correlation of two datasets is represented with bivariate gaussian distribution equation:

$$f(x,y) = \frac{1}{(2\pi)\sigma_1\sigma_2\sqrt{1-\rho^e}} - \frac{1}{2(1-\rho^2)}\left[\left(\frac{x-\mu_1}{\sigma_1}\right)^2 - 2\rho\left(\frac{x-\mu_1}{\sigma_1}\right)\left(\frac{xy-\mu_2}{\sigma_2}\right) + \left(\frac{y-\mu_1}{\sigma_1}\right)^2\right]$$

Wherein f(x,y) is the probability density function, $\sigma_1$ is the standard deviation of $G_{RMS}$, $\sigma_2$ is the standard deviation of $V_{RMS}$. $\mu_1$ is the $G_{RMS}$ mean, $\mu_2$ the $V_{RMS}$ mean, and ρ is the correlation coefficient.

Figure 9:
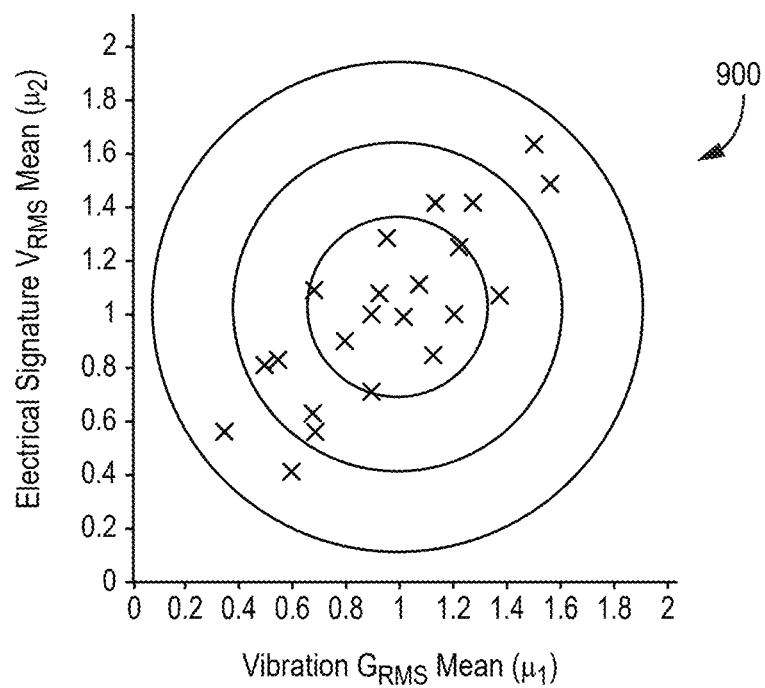
FIG. 9 is a combined graph including the machine vibration $G_{RMS}$ mean $\mu_1$ dataset and the machine electrical signature $V_{RMS}$ mean $\mu_2$ dataset for FIGS. 8A and 8B.

The correlation of the two datasets represented with bivariate gaussian distribution equation is shown in graphical form in the combined graph 900 of FIG. 9. FIG. 9 illustrates the combined two normalized gaussian distribution curves of FIGS. 8A and 8B for the vibration and EMI sensor datasets. With the two normal gaussian distributions, illustrated in the normalized gaussian distribution curves 800 and 802, it's difficult to identify an anomaly as the data can fall within a range. However, when the two gaussian distribution curves 800 and 802 are combined, as illustrated in FIG. 9, there is a better opportunity to detect an anomaly. A bivariate gaussian distribution CLT method, discussed below in detail, further enhances the anomaly detection.

Bivariate normal distribution curves shown in FIGS. 10A and 10B, illustrate healthy sensor datasets taken from two sensors 204 during a learning process discussed below in view of FIG. 15. The controller 206 stores coefficients and data patterns in the non-volatile memory 208. As illustrated in the top view of FIG. 10A and the side perspective view of in FIG. 10B, a three-dimensional normalized bell curve 1000, in this example with healthy datasets, is without skewness in its pattern. The data learning is continuous process in some examples, the reference measurement of healthy datasets with additional dimension of various speeds $N_{RPM}$ are considered for data extraction to generate coefficients and data patterns that are stored for further optimization and as reference template for comparison and decision making.

FIGS. 11A and 11B illustrate an axis aligned multivariate gaussian bell curve 1100 with an elliptical on $V_{RMS}$ with a mean ($\mu_2$). FIGS. 12A and 12B illustrate an axis aligned multivariate gaussian bell curve 1200 with an elliptical on $G_{RMS}$ with a mean ($\mu_1$). FIGS. 13A and 13B illustrate a non-axis aligned multivariate gaussian bell curve 1300 offset on an x and y axis. These are examples of multivariate gaussian bell curve that may be used as a model during a comparison.

The bivariate normal distribution curves show the skewness of the two sensors datasets. Correlation of the two sensors datasets represented in graphical form provide indications of machine anomaly when integrated over time. Closely monitoring these data shift and patterns, edge inferencing may be performed with a customized decision tree. Establishing the linear or multiple polynomial regression forecasts the machine health.

After self-exploratory learning of the healthy dataset and establishing the correlation between the multi sensor dataset over a period of time, a coarse model is stored in the non-volatile memory 208. The model may be verified by analysis using a variance method for testing whether groups of datasets have the same mean value µ.

A further finer model optimization process may also be initiated. The optimized finer model may be recorded in the non-volatile memory 208 for continuous improvement. For example, when the controller 206 of the prognostic and health monitoring system 200 learns the course model, the mean value µ from specific sensors for a parameter, for example for vibration, vibration data is recorded in the memory 208 at every interval. The data recording may continue for days, weeks, etc. Along with recording the vibration data, the model also calculates the CTL to determine mean values u. After a while, weeks and months of data and mean values u will be determined and saved in the memory 208. While verifying the model accuracy, the prognostic and health monitoring system 200 checks periodically, for example daily or weekly for variances in vibration values. If the data is found to be stable without variations of mean values u after a defined period of time, the device stores the verified mean value µ of vibration (in this example) to memory 208. This would be the baseline for which current vibration data will be compared in predicting possible future failures or detecting an anomaly.

Although the example provided above discussed one parameter, vibration, with the prognostic and health monitoring system 200 there may be multiple parameters. For example, an acoustic signature FFT data may be compared with vibration data which would form specific patterns in the multivariate Gaussian distribution that are illustrated in Figures presented in FIGS. 10A through 13B. If there are variations with the patterns during long run tests, then the prognostic and health monitoring system 200 can predict the failure of the generator using a regression analysis method discussed below.

As discussed above, processes implemented by the prognostic and health monitoring system 200 includes sensor data collection, data filtering/preparation, learning, model verification and optimization. Further inferencing and prediction using linear or multiple polynomial regression analysis is applied.

With the multiple polynomial regression, the optimized model, retrieved from the non-volatile memory 208, is further processed through a decision tree for edge inferencing. The basic inferencing data and indicators related to machine failures would be communicated to an external entity outside of the prognostic and health monitoring system 200 for further action. Because of continuous optimization of the model, the prognostic and health monitoring system 200 establishes relationships by regression.

Regression is an approach for modeling the relationship between variables. Linear regression is the relationship between two variables whereas multiple polynomial regression is modeling relationship between multiple variables. The simple least squares approach to regression allows for an approximation of the parameters of a linear model. The goal of this method is to determine the linear model that minimizes the sum of the squared errors between the observations in a dataset and those predicted by a model.

Figure 14:
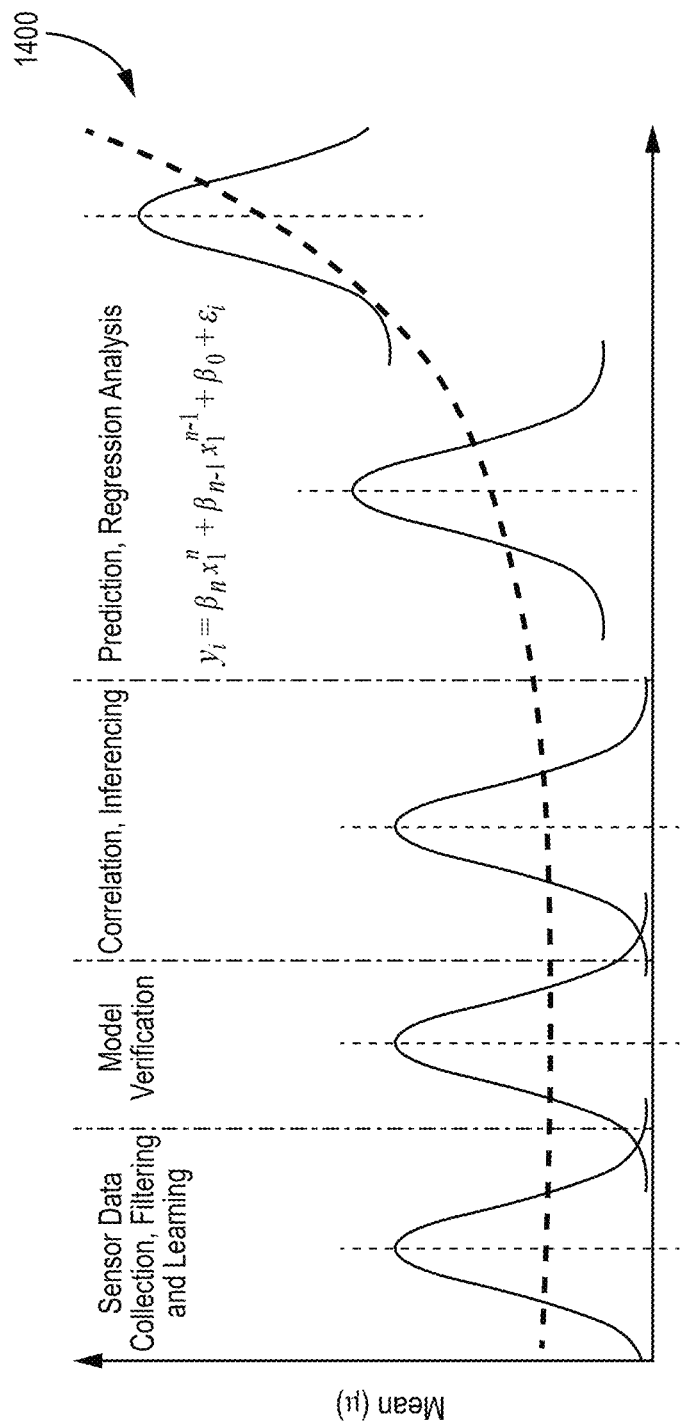
FIG. 14 illustrates a workflow graph according to one exemplary embodiment.

FIG. 14 illustrates a workflow graph 1400 that summarizes a complete workflow of an edge inferencing in a single representation of an example. The mean value and normal gaussian distribution trending signify the various stages; data collection, filtering, healthy dataset learning, model verification, inferencing and prediction. The prediction is provided with the following equation in this example:

$$y_i = \beta_n x_1^n + \beta_{n-1} x_1^{n-1} + \beta_0 + \varepsilon_i$$

Where $y_i$ is a dependent variable, $\beta$ is a population slop co-efficient, and $\varepsilon_i$ is an error.

The described edge inferencing strategy is significant in applicability to either direct sensor data output or its processed formats. The basis of the algorithm instructions is a primary principle enabling large scale success in applied artificial intelligence counterparts that make use of energy-compute resource intensive deep learning-based algorithms. Using the effectiveness of the principle leveraged in large scale systems on a tiny edge sensing platform augments the primary sensing operations of mere sensing systems with generalizable intelligence across the observable data captured as part of sensor outputs. The methodology described herein seeks to attain performance of applied artificial intelligence with orders of magnitude reduction in the required resources.

Figure 15:
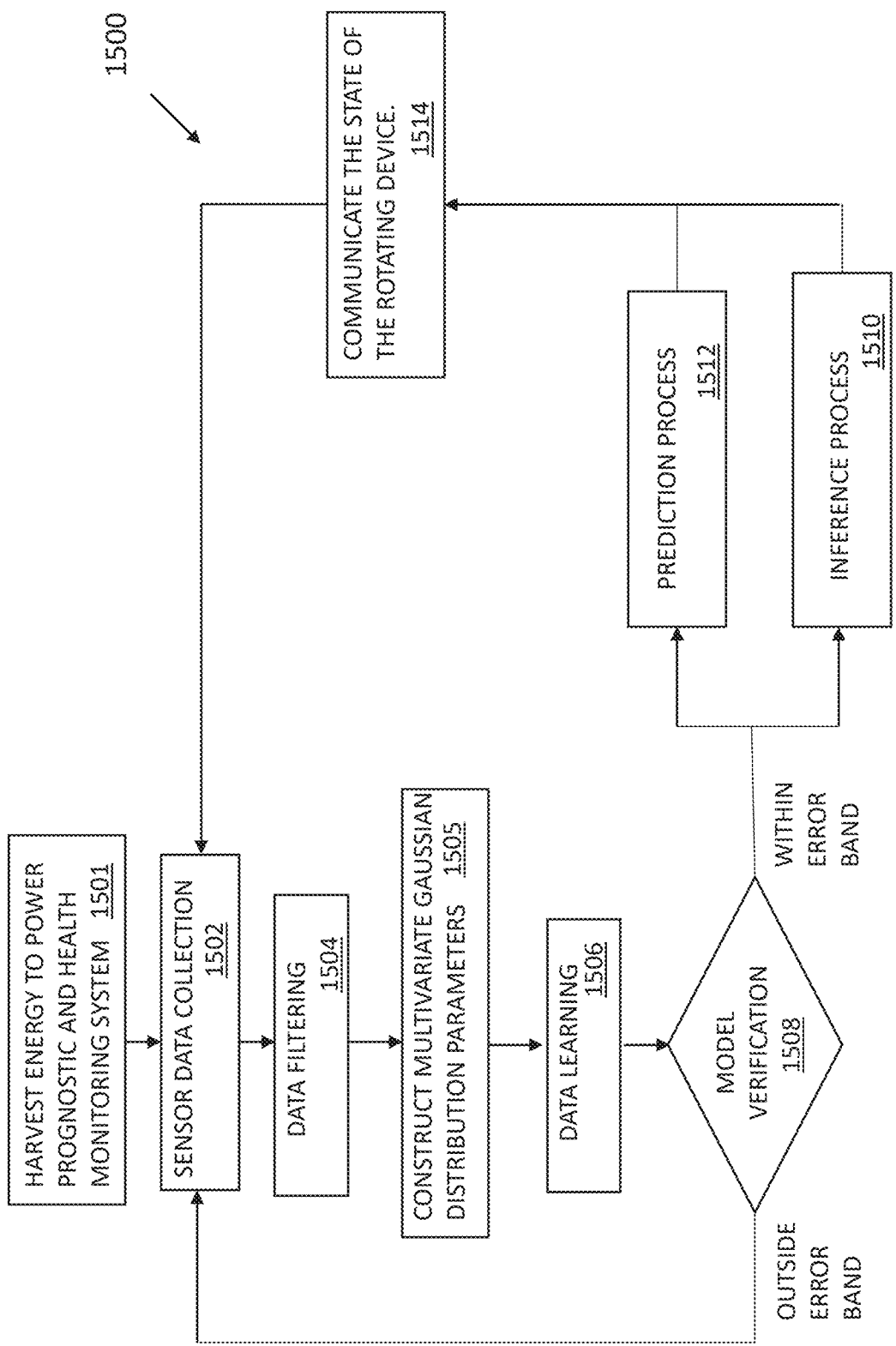
FIG. 15 illustrates a prognostic and health monitoring system flow diagram according to one exemplary embodiment.

A prognostic and health monitoring system flow diagram 1500 is illustrated in FIG. 15. The prognostic and health monitoring system flow diagram 1500 is provided as a sequence of blocks. The sequence of the blocks may be different or run in parallel in other embodiments. Hence, the edge interference workflow is not limited to the sequential sequence of blocks illustrated in FIG. 15.

The prognostic and health monitoring system flow diagram 1500 starts at block 1501 where energy is harvested to power the prognostic and health monitoring system 200 for a device with a rotating component such as a generator. Once powered, sensor data is collected at block 1502 from different types of sensors 204. The sensor data from the different type of sensors 204 is filtered at block 1504.

In block 1504 data preparation is done to clean the raw sensor data. Data collected from the real world such as motors, compressors, pumps, generators is transformed to a clean dataset. Raw sensor data may contain inconsistent values and therefore should not be directly used for learning and modeling. Cleaning the dataset may involve removing instances having missing values, estimating the missing values of instances using statistical method, and removing duplicate instances. The filtering block 1504 further normalizes the sensor data in the dataset. As discussed above, normalizing the data may include filtering by machine speed $N_{RPM}$.

From the normalized sensor data, multivariate gaussian distribution parameters are constructed at block 1505. At block 1506 data learning takes place. In this stage, previous multivariant gaussian distribution parameters determined from the normalized sensor data that is stored in the memory 208 is compared with gaussian distribution parameters from a then current set of normalized sensor data. Errors are measured between comparisons integrated over time to verify the model accuracy at block 1508. In one example, the mean of gaussian distribution parameters with the current set of normalized data is used for verification. Verification occurs at block 1508 using a defined error band. In an example, if the comparison results are outside the defined error band, the process continues collecting sensor data at block 1502 unit such time as the comparison results are within the defined error band. Once the comparison results are within the error band, a model is verified at block 1508. The model is used to determine a state of the device 202 with a rotating component in the interfacing and prediction processes of blocks 1510 and 1512.

At the interface process at block 1510, based on the model and a current sensor dataset statistical data transformation is performed on the model and a current sensor dataset. A decision tree is applied on the multi sensor fusion to inference the probable machine failures. A current condition of the device is communicated remotely at block 1514 by the communication system 210. The communication may issue warnings and notifications of the type of device failures if detected.

Further at block 1512, based on the model and the current sensor dataset, a relationship is established between multi sensors with linear or multiple polynomial regression method to predict device failures in advance. The type of device failures may also be detected using different sensor types and datasets. A prediction of a failure of the device is communicated remotely at block 1514 by the communication system 210. The process then continues collecting data samples at block 1502. In one example, if a current condition does not indicate a failure of the device, data from the current sensor dataset may be used to further improve the model.

EXAMPLE EMBODIMENTS

Example 1 is a prognostic and health monitoring system for a device with a rotating component, the system including a plurality of sensors, a controller, and a communication system. Each sensor is configured to sense a parameter of the device and output sensor signals based on the sensed parameter. The controller is in communication with the output sensor signals. The controller, based on instructions stored in a memory, is configured to filter the output sensor signals based on operational speed data of the rotating component of the device to obtain normalized sensor data, construct multivariate gaussian distribution parameters from the normalized sensor data using a central limit theorem, compare a model generated with a learning algorithm applied to previous constructed multivariate gaussian distribution parameters with the constructed multivariate gaussian distribution parameters, and determine a state of the device based at least in part on the comparison of the model with the constructed multivariate gaussian distribution parameters. The communication system is in communication with the controller to communicate the determined state of the device to a remote location.

Example 2, includes the system of Example 1, further including an energy harvesting system that is configured to harvest energy from the device to power at least one of the controller, the communication system, and at least one of the sensors of the plurality of sensors.

Example 3 includes the system of Example 2, further including a sensor node. The sensor node housing the controller, the communication system, the energy harvesting system and at least one of the sensors of the plurality of sensors.

Example 4 includes the system of any of the Examples 2-3, further including at least one energy harvester, at least one energy storage device and an energy controller. The at least one energy harvester is used to convert energy from an energy source to a current signal. The at least one energy storage device is used to store energy. The energy controller is in communication with the energy harvester to receive the current signal. The energy controller is further configured to store energy from the current signal in the at least one energy storage device when power is not needed and power the at least one controller, communication system, and the at least one of the sensors of the plurality of sensors when power is needed.

Example 5 includes the system of any of the Examples 1-4, wherein the controller is further configured to verify the model of the previous multivariate gaussian distribution parameters by establishing a correlation within an select error band between mean values of multivariate gaussian distribution parameters over at least one interval of time.

Example 6 includes the system of any of the Examples 1-5, wherein determining a state of the device includes at least one of, inferring probable device failures by monitoring data shifts in patterns between the model of the previous multivariate gaussian distribution parameters and the constructed multivariate gaussian distribution parameters using edge inferencing with a decision tree; and predicting device failures using one of linear and multiple polynomial regression methods based on the model and the constructed multivariate gaussian distribution parameters.

Example 7 includes a prognostic and health monitoring system for a device with a rotating component, the system includes at least one sensor node and a controller. Each sensor node included a plurality of sensors configured to sense a plurality of different parameters and output sensor signals based on the sensed parameters. A sensor node of the at least one sensor node is further configured to harvest energy to power at least one sensor of the plurality of sensors. The controller is in communication with the output sensor signals. The controller is configured to filter the output sensor signals based on machine operational speed data to obtain normalized sensor data, construct multivariate gaussian distribution parameters from the normalized sensor data with a learning algorithm using a central limit theorem, compare a model formed from previous multivariate gaussian distribution parameters with the constructed multivariate gaussian distribution parameters, and determine a state of the device with the rotating component based at least in part on the comparison of the model with the constructed multivariate gaussian distribution parameters.

Example 8 includes the system of claim 7, wherein the model formed from previous multivariate gaussian distribution parameters is verified by establishing correlations within an select error band between mean values of multivariate gaussian distribution parameters over at least one interval of time.

Example 9 includes the system of any of the Examples 7-8, wherein determining the state of the device includes at least one of, inferring probable device failures by monitoring data shifts in patterns between the model of the previous multivariate gaussian distribution parameters and the constructed multivariate gaussian distribution parameters using edge inferencing with a decision tree; and predicting device failures using one of linear and multiple polynomial regression methods based on the model and the constructed multivariate gaussian distribution parameters.

Example 10 includes the system of any of the Examples 7-9, wherein the learning algorithm and the central limit theorem are applied for at least one of time domain features and frequency domain features.

Example 11 includes the system of Example 10, wherein the time domain features include at least one of a root mean square (rms), a crest factor, and a variance and the frequency domain features included at least one of a power spectral density, a side band, a center frequency, and an energy spread.

Example 12 includes the system of any of the Examples 7-11, wherein the at least one sensor node is configured to harvest energy is configured to harvest energy from at least one of vibrations, thermal gradients and rotational electromagnetic energy.

Example 13 includes the system of any of the Examples 7-12, wherein at least one sensor node of the plurality of sensor is configured to operate at a lowest harvested power mode.

Example 14 includes the system of any of the Examples 7-13, wherein the plurality of sensors includes at least one of a temperature sensor, a humidity sensor, a pressor sensor, an ultra sound sensor, an acoustic sensor, a non-invasive electromagnetic interference sensor, a non-invasive magnetic sensor, a non-invasive magnetic field sensor, a non-invasive electric field sensor, current clamp sensor, speed sensor, rotating gear sensor, vibration sensor and an infrared image sensor.

Example 15 includes a method of monitoring a health of a device with a rotational component, the method comprising: sensing a plurality of parameters associated with an operation of the device with the rotational component to generate sensing signals with a plurality of sensors; filtering the sensing signals based on operational speeds of the rotational component of the device to generate normalized sensor data; constructing multivariate gaussian distribution parameters from the normalized sensor data with a controller implementing a learning algorithm using a central limit theorem; comparing a model of previous multivariate gaussian distribution parameters with the constructed multivariate gaussian distribution parameters; determining a state of the device with a rotational component based at least in part on the comparison of the model with the constructed multivariate gaussian distribution parameters; and communicating the determined state of the device with a rotational component to a remote location with a communication system that is in communication with the controller.

Example 16 includes the method of Example 15 further including harvesting energy off of the device with the rotational component with at least one energy harvester to power at least one of the controller, the communication system, and at least one sensor of the plurality of sensors.

Example 17 includes the method of Example 16, wherein at least one sensor of the plurality of sensors and the at least one energy harvester are housed in a sensor node.

Example 18 includes the method of any of the Examples 15-17, wherein the controller is further configured to do at least one of inferring probable device failures by monitoring data shifts in patterns between the model of the previous multivariate gaussian distribution parameters and the constructed multivariate gaussian distribution parameters using edge inferencing with a decision tree; and predicting device failures using one of linear and multiple polynomial regression methods based on the model and the constructed multivariate gaussian distribution parameters.

Example 19 includes the method of any of the Examples 15-18, further including applying the learning algorithm using the central limit theorem for at least one of time domain features and frequency domain features, the time domain features including at least one of a root mean square, a crest factor, and a variance, the frequency domain features including at least one of a power spectral density, a side band, a center frequency and an energy spread.

Example 20 includes the method of any of the Examples 15-19, further comprising: validating the model of the previous multivariate gaussian distribution parameters by establishing correlations within an select error band between mean values of multivariate gaussian distribution parameters over at least one interval of time.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A prognostic and health monitoring system for a device with a rotating component, the system comprising:
a plurality of sensors, each sensor configured to sense a parameter and output sensor signals based on the sensed parameter;
a controller in communication with the output sensor signals, the controller based on instructions stored in a memory configured to,
filter the output sensor signals based on operational speed data of the rotating component of the device to obtain normalized sensor data,
construct multivariate gaussian distribution parameters from the normalized sensor data using a central limit theorem,
compare parameters of a model generated with a learning algorithm applied to previous constructed multivariate gaussian distribution parameters with the constructed multivariate gaussian distribution parameters, and
determine a state of the device based at least in part on the comparison of the parameters of the model with the constructed multivariate gaussian distribution parameters, wherein determining the state of the device includes at least one of,
inferring probable device failures by monitoring data shifts in patterns between the model and the constructed multivariate gaussian distribution parameters using edge inferencing with a decision tree, and
predicting device failures using one of linear and multiple polynomial regression methods based on the parameters of the model and the constructed multivariate gaussian distribution parameters;
a communication system in communication with the controller to communicate the determined state of the device to a remote location.

2. The system of claim 1, further comprising:
an energy harvesting system configured to harvest energy from the device to power at least one of the controller, the communication system, and at least one of the sensors of the plurality of sensors.

3. The system of claim 1, further comprising:
a sensor node, the sensor node housing the controller, the communication system, the energy harvesting system, and at least one of the sensors of the plurality of sensors.

4. The system of claim 1, wherein the energy harvester system further comprises:
at least one energy harvester to convert energy from an energy source to a current signal; at least one energy storage device to store energy; and
an energy controller in communication with the energy harvester to receive the current signal, the energy controller further configured to store energy from the current signal in the at least one energy storage device when power is not needed and power the at least one controller, communication system, and the at least one of the sensors of the plurality of sensors when power is needed.

5. The system of claim 1, wherein the controller is further configured to verify the model of the previous multivariate gaussian distribution parameters by establishing a correlation within a select error band between mean values of multivariate gaussian distribution parameters over at least one interval of time.

6. A prognostic and health monitoring system for a device with a rotating component, the system comprising:
at least one sensor node, each sensor node including a plurality of sensors configured to sense a plurality of different parameters and output sensor signals based on the sensed parameters, a sensor node of the at least one sensor node configured to harvest energy to power at least one sensor of the plurality of sensors; and
a controller in communication with the output sensor signals, the controller configured to,
filter the output sensor signals based on machine operational speed data to obtain normalized sensor data,
construct multivariate gaussian distribution parameters from the normalized sensor data with a learning algorithm using a central limit theorem,
compare parameters of a model formed from previous multivariate gaussian distribution parameters with the constructed multivariate gaussian distribution parameters, and
determine a state of the device with the rotating component based at least in part on the comparison of the parameters of the model with the constructed multivariate gaussian distribution parameters, wherein determining the state of the device includes at least one of,
inferring probable device failures by monitoring data shifts in patterns between the parameters of the model and the constructed multivariate gaussian distribution parameters using edge inferencing with a decision tree, and
predicting device failures using one of linear and multiple polynomial regression methods based on the parameters of the model and the constructed multivariate gaussian distribution parameters.

7. The system of claim 6, wherein the parameters of the model formed from previous multivariate gaussian distribution parameters are verified by establishing correlations within a select error band between mean values of multivariate gaussian distribution parameters over at least one interval of time.

8. The system of claim 6, wherein the learning algorithm and the central limit theorem are applied for at least one of time domain features and frequency domain features.

9. The system of claim 8, wherein the time domain features include at least one of a root mean square (rms), a crest factor, and a variance and the frequency domain features included at least one of a power spectral density, a side band, a center frequency, and an energy spread.

10. The system of claim 6, wherein the at least one sensor node is configured to harvest energy is configured to harvest energy from at least one of vibrations, thermal gradients and rotational electromagnetic energy.

11. The system of claim 6, wherein at least one sensor node of the plurality of sensor is configured to operate at a lowest harvested power mode.

12. The system of claim 6, wherein the plurality of sensors includes at least one of a temperature sensor, a humidity sensor, a pressor sensor, an ultra sound sensor, an acoustic sensor, a non-invasive electromagnetic interference sensor, a non-invasive magnetic sensor, a non-invasive magnetic field sensor, a non-invasive electric field sensor, current clamp sensor, speed sensor, rotating gear sensor, vibration sensor and an infrared image sensor.

13. A method of monitoring a health of a device with a rotational component, method comprising:
sensing a plurality of parameters associated with an operation of the device with the rotational component to generate sensing signals with a plurality of sensors;
filtering the sensing signals based on operational speeds of the rotational component of the device to generate normalized sensor data;
constructing multivariate gaussian distribution parameters from the normalized sensor data with a controller implementing a learning algorithm using a central limit theorem;
comparing parameters of a model of previous multivariate gaussian distribution parameters with the constructed multivariate gaussian distribution parameters;
determining a state of the device with a rotational component based at least in part on the comparison of the parameters of the model with the constructed multivariate gaussian distribution parameters, wherein determining the state of the device includes at least one of,
inferring probable device failures by monitoring data shifts in patterns between the model and the constructed multivariate gaussian distribution parameters using edge inferencing with a decision tree, and
predicting device failures using one of linear and multiple polynomial regression methods based on the parameters of the model and the constructed multivariate gaussian distribution parameters; and
communicating the determined state of the device with a rotational component to a remote location with a communication system that is in communication with the controller.

14. The method of claim 13, further comprising:
harvesting energy off of the device with the rotational component with at least one energy harvester to power at least one of the controller, the communication system, and at least one sensor of the plurality of sensors.

15. The method of claim 13, wherein at least one sensor of the plurality of sensors and the at least one energy harvester are housed in a sensor node.

16. The method of claim 13, further comprising:
applying the learning algorithm using the central limit theorem for at least one of time domain features and frequency domain features, the time domain features including at least one of a root mean square, a crest factor, and a variance, the frequency domain features including at least one of a power spectral density, a side band, a center frequency and an energy spread.

17. The method of claim 13, further comprising:
validating the model of the previous multivariate gaussian distribution parameters by establishing correlations within an select error band between mean values of multivariate gaussian distribution parameters over at least one interval of time.

* * * * *